United States Patent [19]
Molnar

[11] Patent Number: 4,619,593
[45] Date of Patent: Oct. 28, 1986

[54] APPARATUS COMPRISING A TURBINE AND ASSOCIATED WATER EXTRACTOR AND METHOD OF TRANSLATING THE POTENTIAL ENERGY OF DEEP SEA WATER INTO USEFUL WORK

[76] Inventor: Steven Molnar, 111-09 Seventy Sixth, Forest Hills, N.Y. 11375

[21] Appl. No.: 307,387

[22] Filed: Oct. 1, 1981

Related U.S. Application Data

[63] Continuation-in-part of Ser. No. 74,340, Sep. 11, 1979, abandoned.

[51] Int. Cl.$^4$ ............................................... F04B 7/04
[52] U.S. Cl. ..................................... 417/498; 60/398; 91/408; 222/385
[58] Field of Search ................. 60/398, 496, 497, 503; 91/407, 408; 417/334, 490, 498; 222/385

[56] References Cited

U.S. PATENT DOCUMENTS

| | | | |
|---|---|---|---|
| 3,138,066 | 6/1964 | Walker | 91/408 |
| 3,205,969 | 9/1965 | Clark | 60/398 |
| 3,436,914 | 4/1969 | Rosfelder | 60/398 |
| 3,504,648 | 4/1970 | Kriedt | 60/398 |
| 3,595,012 | 7/1971 | Beck, Jr. | 60/398 |
| 3,961,479 | 6/1976 | Anderson | 60/496 |
| 3,994,134 | 11/1976 | Molnar | 60/496 |
| 4,013,382 | 3/1977 | Diggs | 60/398 |
| 4,123,667 | 10/1978 | Decker | 60/497 |
| 4,141,670 | 2/1979 | Russell | 60/497 |
| 4,193,265 | 3/1980 | Ootsu | 60/398 |
| 4,215,544 | 8/1980 | Stanwick | 60/398 |

FOREIGN PATENT DOCUMENTS

| | | | |
|---|---|---|---|
| 2400969 | 7/1975 | Fed. Rep. of Germany | 91/408 |
| 652361 | 3/1979 | U.S.S.R. | 91/408 |

Primary Examiner—Abraham Hershkovitz
Attorney, Agent, or Firm—Arthur T. Fattibene

[57] ABSTRACT

This disclosure is directed to a method and combined apparatus for converting or translating the immense potential energy of the deep sea water into useful work by providing a jointly enclosed environment in a column or mass of a fluid in which a container or vessel is maintained under a pressure which is less than that of the pressure exerted by the deep sea water. The apparatus consists of two, in all respects entirely independent, machines with individual performances and with entirely separated energy consumptions operatively connected to achieve the end result.

A fluid activated work producing machine is disposed so as to be actuated by the continuous differential in pressure between the pressure exerted by the continuous deep sea water and the low pressure of the environment in an associated container or vessel. This is achieved by a fluid actuated work producing machine having a water inlet in communication with the high pressure of the sea water and a water outlet in communication with the reduced pressure of the enclosed environment in the associated vessel, whereby the natural flow of water from the higher to lower pressure effects the drive of the work producing machine. To maintain the operation of the work producing machine, the water flowing into the enclosed environment or vessel is extracted by an independent and novel water extractor whereby the extracted water is returned to the sea at a rate sufficient to maintain the pressure of the enclosed environment or vessel at all times below that of the sea.

The invention establishes a new technology for production of electricity and/or work.

7 Claims, 13 Drawing Figures

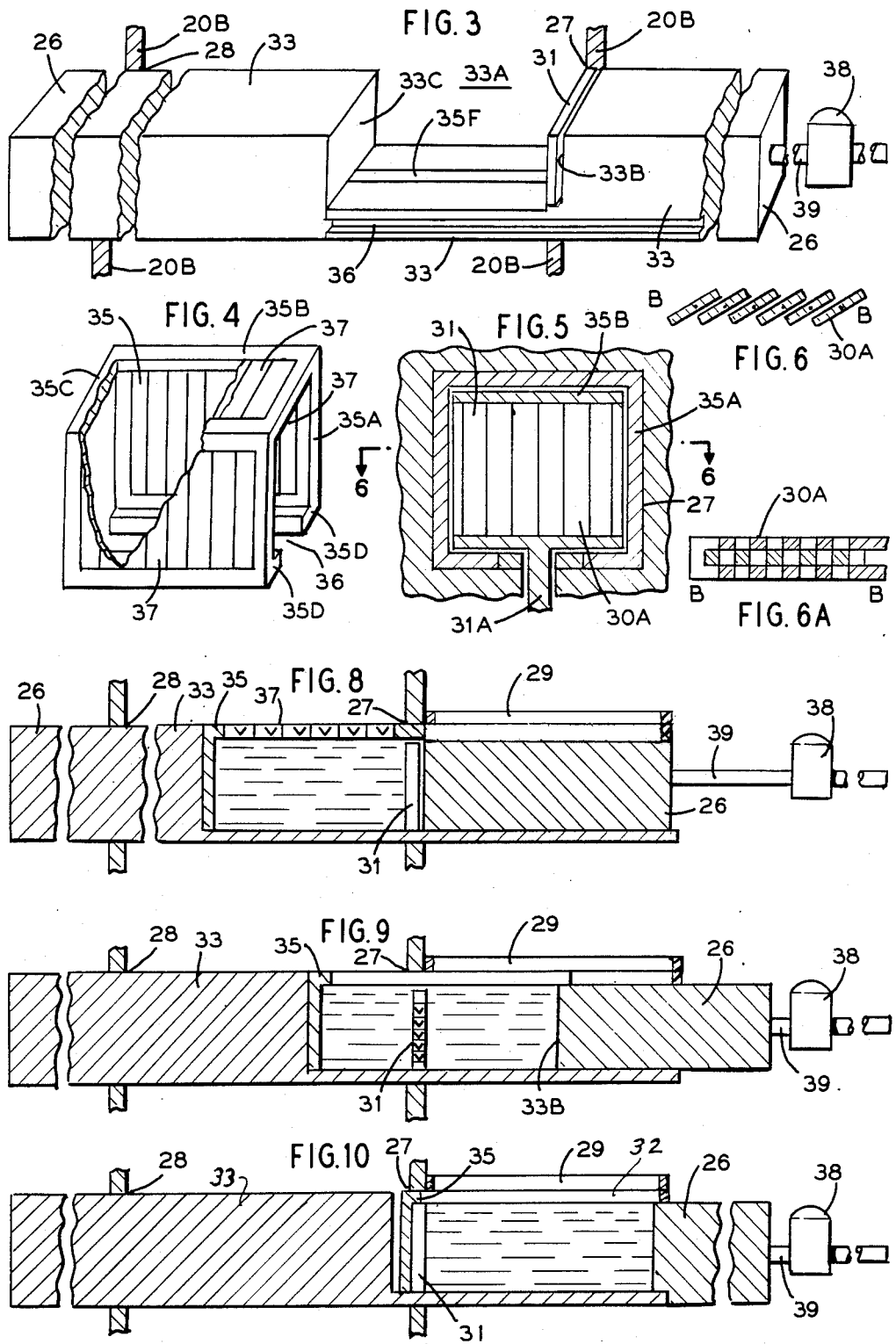

APPARATUS COMPRISING A TURBINE AND ASSOCIATED WATER EXTRACTOR AND METHOD OF TRANSLATING THE POTENTIAL ENERGY OF DEEP SEA WATER INTO USEFUL WORK

RELATED APPLICATIONS

This application is a continuation in part of my application Ser. No. 074,340 filed Sept. 11, 1979 and now abandoned.

PRIOR ART

In view of the present day energy crisis various efforts have been made, and are being made, to harness the vast potential energies found in nature. Various efforts have been made to harness the energy of the sun, wind and oceans. It is known that various types of machines have been developed to translate the wave action of the oceans to produce useful work. In my prior U.S. Pat. No. 3,997,134 there is disclosed an apparatus for translating the potential energy of the oceans into useful kinetic energy. The present invention consititutes a further fundamentally changed and improved effort to harness the potential energy which exists in large masses of seas.

OBJECTS

An object of this invention is to provide a method and apparatus for converting potential energy of a mass of deep sea water into useful work by disposing in the mass of deep sea an environment which is maintained at a pressure which is less than the pressure exerted by the surrounding sea, and utilizing the differential of such pressures to effect the drive or operation of a power producing machine the output of which is used to do useful work.

Another object is to provide a relatively simple and positive operating device for producing useable energy by the translation of the potential energy normally occurring in deep sea water into kinetic energy.

Another object is to provide a power generating device which can be submerged in the seas whereby the potential energy of the seas can be translated into useable kinetic energy, and which kinetic energy can thereafter be translated into useful work.

Another object is to provide an implement for extracting a volume of fluid from an area of reduced pressure and discharging the extracted fluid stepwise into an area of higher pressure.

BRIEF SUMMARY OF INVENTION

The foregoing objects and other features and advantages of this invention are attained by a device which includes a tank or chamber which is submerged in deep sea water, wherein the pressure within the tank or chamber is less than that of the pressure exerted upon it by the surrounding sea. A fluid actuated machine such as a turbine is disposed so as to have its inlet end in communication with the high pressure of the sea and the outlet of the turbine is connected in communication with the chamber which is maintained at a pressure substantially lower than that exerted by the sea. The arrangement is such that the natural flow of water from the high pressure side to the low pressure side of the work producing machine effects the drive thereof. Connected to the turbine is an electrical generator or other suitable power producing machine for translating the kinetic energy of the turbine into useful work.

To render the operation of the turbine continuous, the tank or chamber includes a fluid extraction device which is operative to effect the extraction of the water being discharged into the tank during the operation of the turbine. The arrangement is such that the rate at which the fluid is extracted from the tank is substantially equal to the rate at which the water enters the tank so that the pressure within the tank is maintained at all times below that of the surrounding sea water. The extraction device is in the form of a reciprocating beam having a pocket formed therein which co-acts with a displacement cage and associated air tank extension in a manner whereby the reciprocation of the beam effects the displacement of a predetermined volumn of fluid from within the reduced pressure environment of the tank to a position external to the tank; first into the immediate tank extension with temporarily depressurized water contents, then following final displacement of the water portion to the surrounding sea being effected upon the return stroke of the beam. Thus the reciprocation of the fluid extracting device in one direction effects the displacement of a predetermined volumn of fluid from the area of reduced pressure within the chamber to position external of the chamber into the tank extension; and upon the return stroke the displaced volume of fluid is discharged directly into the surrounding sea.

The reciprocation of the extractor requires only a small fraction of the pressure and energy exerted by the surrounding high potential energy of the deep sea water on the turbine blades, as it is elaborated hereinafter.

Both machines, the turbine generator unit and the extractor have their own separate external driving forces. The turbine generator unit receives it from the sea, while the extractor receives its power from a motor, a battery or perhaps from any other desired external power sources. The turbine generator unit has its own energy input and work output, while the extractor has its own basically differing energy input and work output. Both components keep fully their individuality. They represent two independent systems working to produce a desired result. Both components are in themselves complete and independent and each operating strictly within the laws of known physics.

The extractor may have separate utility and may be used with or without the associated turbine generator unit. For example, the extractor could be used to remove water from any closed space which has an air cushion, such as a ship wreckage wherein power can be supplied by a relatively small accumulator or from a surface power source, or electric motor.

The present invention exploits overlooked possibilities of hydrodynamics. The radical harnessing of the potent deep sea water is provided by exploiting two simple hydrodynamical phenomena. First, by letting act two equal, opposed and thereby equalized high sea pressure forces at the two ends of the extractor beam; secondly by the temporary, repeated exclusion of the high sea pressures from the tank extension by the co-action of its valves. These two arrangements save energy in the electricity production in average of 90 percent. The tank extension has key-role in the procedure. By operation of its valves the high water pressure temporarily and repeatedly disappears from the tank extension. Therefore, the displacement cage, with a used water portion, is able to reach a sea area outside the tank but within the tank extension, by a minimal effort.

FEATURES AND ADVANTAGES

A feature of this invention resides in the provision of an apparatus and method wherein the potential energy inherent in the deep sea water is utilized and/or translated into useful work.

Another feature resides in the provision of an apparatus which can be submerged in the seas to a predetermined depth whereby the differential operating pressures for effecting the drive of any associated fluid actuated machine is rendered proportional to the depth at which the apparatus is submerged.

Another feature resides in the provision of an apparatus and method for translating the potential energy in deep sea water into useful work by insuring the continuous operation of a fluid actuated machine by providing an extractor for the effective displacement and discharge of the actuating fluid back to the surrounding sea.

Another advantage of the invention is that the proposed turbine generator unit does not consume any fuel as it is operated solely by the potential energy of sea water.

Another advantage of the invention resides in the actuality that the apparatus does not include any high-priced heating and/or cooling installations resulting thereby in low constructional expenditures and low upkeep costs.

Another advantage of the invention resides in the fact that the novel components of the apparatus can be standardized, facilitating thereby quick development of power plants.

Another advantage of the device resides in the fact that it operates without any resulting polutents being added to the environment.

Other features and advantages will become more readily apparent when considered in view of the drawings and specification in which:

FIG. 3 is a detailed perspective view of a portion of the apparatus; namely, the extracting beam.

FIG. 4 is a detailed perspective view of a component part of the extractor; namely, the displacement cage.

FIG. 5 is a cross sectional view taken along line 5—5 on FIG. 7 to illustrate the valve means for valving the tank opening.

FIG. 6 comprises a section view taken along line 6—6 on FIG. 5.

FIG. 6A is a modified construction.

Figure 7:
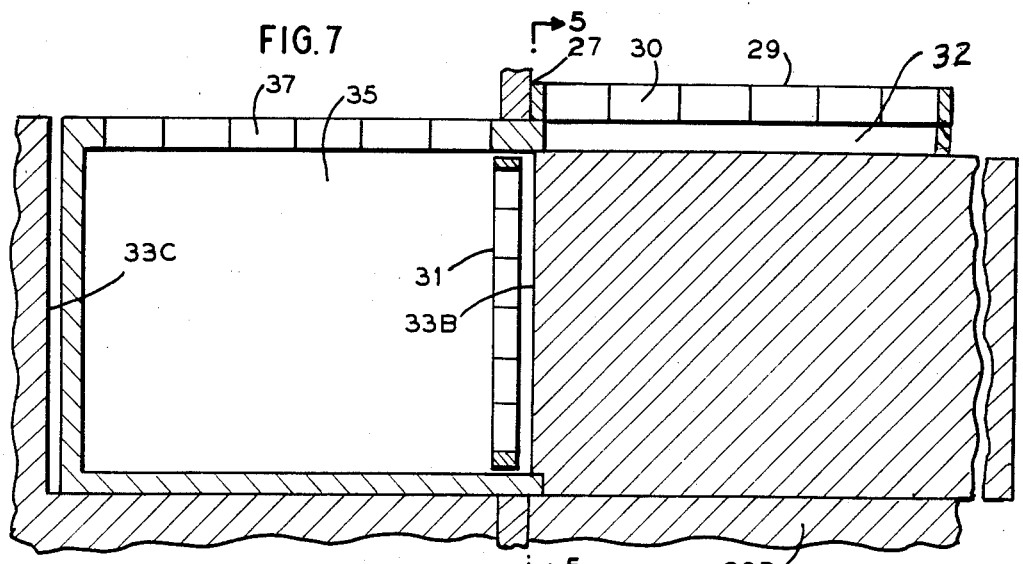

FIG. 7 is a longitudinal sectional view of the displacement cage and associated air tank extension and of the valve for the tank wall opening and extractor beam.

FIG. 8 is a diagrammatical, longitudinal, sectional view of the extracting beam and displacement cage in retracted position relative to the air tank extension and the tank wall opening valve; the top displacement cage valve is opened and all other valves are closed.

FIG. 9 is a view similar to that of FIG. 8 showing the extractor beam and displacement cage in partially protracted position in which only the tank wall opening valve is in its opened position.

FIG. 10 is a view similar to that of FIG. 8 but showing the extractor beam and displacement cage in fully protracted position; all valves are in closed position.

Figure 11:
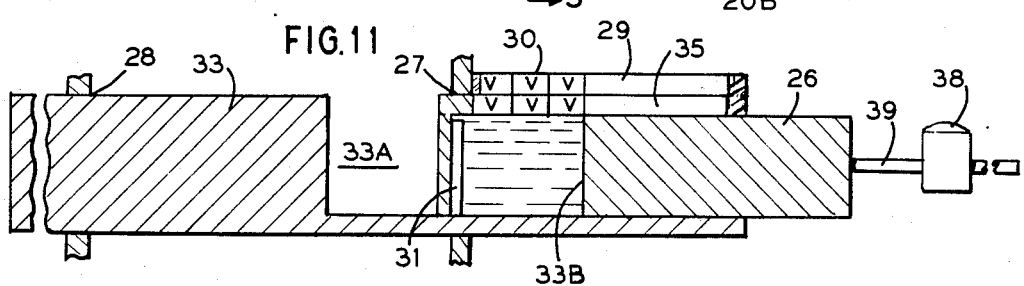

FIG. 11 is a view similar to that of FIG. 9 but showing the extractor beam in partially retracted position and the displacement cage in fully protracted position; the side wall valves of the displacement cage and of the tank extension are in coinciding opened position.

Figure 12:
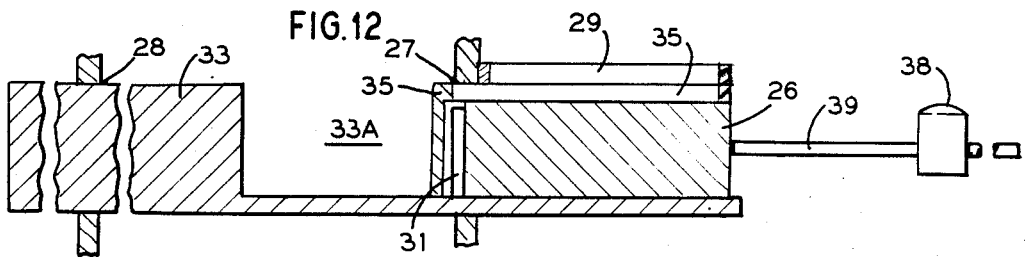

FIG. 12 is a view similar to that of FIG. 9, but showing the extractor beam in fully retracted position, the displacement cage in fully protracted position with all valves in closed position.

Figure 13:
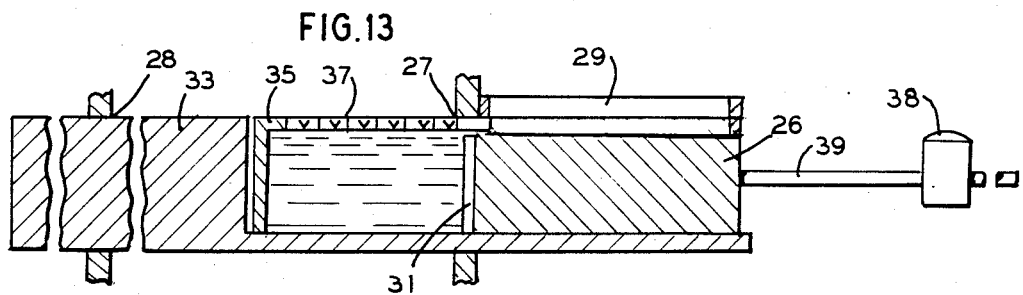

FIG. 13 is a view similar to that of FIG. 8, showing the extractor beam and the displacement cage fully retracted in their original position with only the top valve of the displacement cage in opened position.

DETAILED SPECIFICATION

This invention is directed to a method and apparatus of translating the potential energy of the deep sea water into useful work. The deep sea water has tremendous potential energy which is readily available. In accordance with this invention the potential energy of the seas or oceans can be translated into useful energy by submerging into it a tank or chamber 20 having an internal pressure remarkably lower than that of the surrounding sea or ocean 21. A fluid actuated machine, such as for example a turbine 22 and an associated electrical generator 23 or other work producing device is disposed in the deep sea water so that the inlet 22A to the high pressure side of the turbine 22 is disposed in communication with the deep seas water, and that the outlet 22B of the turbine is disposed in communication with the low pressure environment within the air tank 20. The arrangement is such that the pressure differential between the pressure being exerted by the sea and the reduced pressure within the tank 20 will cause a natural flow of water to occur from the inlet 22A to the outlet 22B of the turbine 22 so as to effect the drive thereof.

To maintain the operation of the fluid actuated machine or turbine 22 continuous and to prevent the chamber or tank 20 from completely filling with the fluid so as to maintain the pressure differential, the fluid discharging into the chamber, vessel or tank 20 is extracted and discharged by an extractor 33 into the surrounding sea at a rate substantially equal to the rate at which the water is emptying into the tank 20 during the actuation of the turbine 22.

Figure 2:
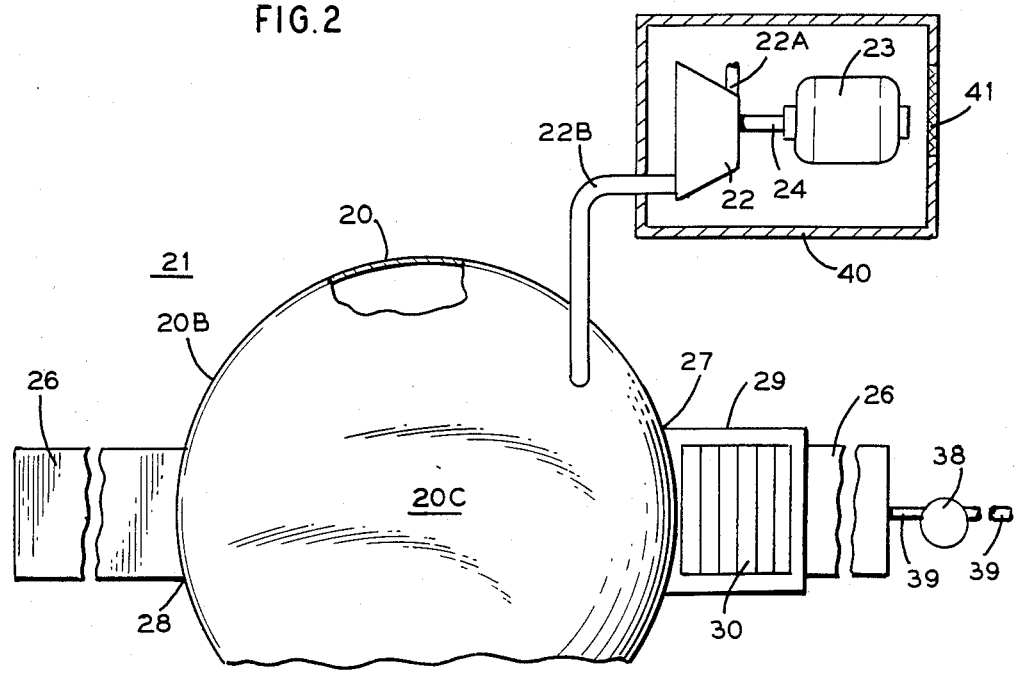
FIG. 2 is a top plan view of FIG. 1.
Figure 1:
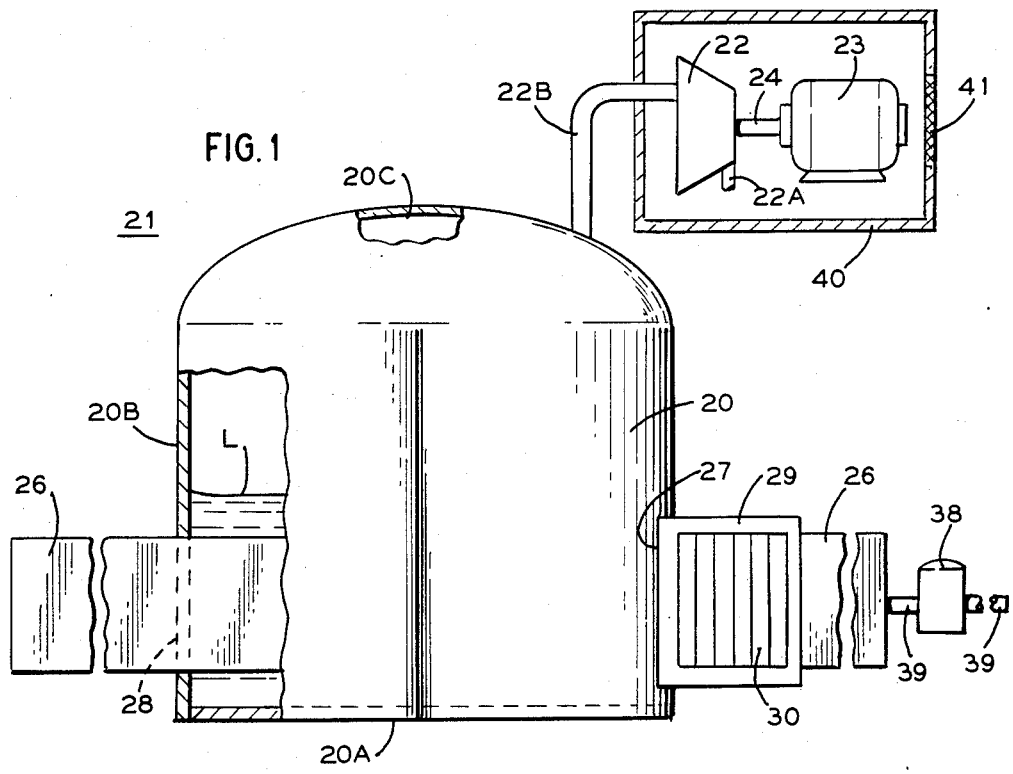
FIG. 1 is a side elevation view of the system embodying the present invention, and having parts thereof shown in section.

Referring to the drawings there is illustrated in FIGS. 1 and 2 an apparatus by which the foregoing method can be practiced. Included in the device is a closed tank or vessel chamber 20 which is adapted to be submerged in an ocean. For example, the tank 20 can be located on the floor of a sea or ocean or can be suspended at any predetermined depth depending upon the design pressure the turbine 22 is to be operated at. It will be understood that the deeper the chamber 20 is submermged in the seas, the greater will be the useful pressure differential as will be hereinafter described.

The tank or chamber 20 is defined by a bottom wall 20A having connected thereto a circumscribing side wall 20B and a connected top wall 20C. It will be understood that the respective walls are made sufficiently strong so as to withstand the pressures exerted upon them by the surrounding sea water 21. To prevent foreign matter from passing through the turbine 22, the latter may be located in a housing 40 having a screened opening 41.

Operatively associated with the turbine shaft 24 so as to be driven thereby is a suitable electrical generator, motor or other work producing means 23, the output of which can be readily utilized to do useful work in any well known manner.

In accordance with this invention, a pressure is maintained within the interior of tank or chamber 20 which is substantially less than the pressure exerted upon it by the surrounding sea water 21. For example, the pressure within the tank 20 may be maintained at a normal atmospheric pressure as for example approximately 15 pounds per square inch; whereas the pressure of the surrounding water is determined by the depth at which the tank 20 is located. Sea water pressure increases approximately by a half pound per square inch for every foot of depth. Therefore, the deeper the tank 20 is located, the greater becomes the differential pressure available for operating the work producing machine as will be hereinafter described. The arrangement is such that the pressure within the tank 20 is always maintained substantially less than the pressure being exerted by the surrounding mass of sea 21.

In the illustrated embodiment, a work producing machine is shown in the form of a water turbine 22. The turbine outlet 22B is operatively connected to the interior of chamber 20 and the tubine inlet 22A is disposed in communication with the high pressure of the surrounding sea 21. A suitable power or work means, as for example an electrical generator 23 is operatively connected to the output shaft 24 of the turbine whereby the actuation of the turbine as hereinabove described results in the drive of the electrical generator 23, the output of which is utilized to useful work. However, it will be understood that the output of the turbine 22 can be connected to any other suitable machine for producing useful work. It will thus be noted that the pressure differential operating on the inlet and outlet side of the turbine 22 will effect a natural flow of water through the turbine to effect the drive thereof.

In accordance with this invention, as best seen in FIG. 1, chamber 20 will normally contain a supply of water as to define a water level L therein which is at relatively low pressure. To prevent the chamber 20 from filling up with water emptying thereinto during the operation of the turbine 22, an extraction means 26 is provided for effecting the removal of the water from chamber 20; and discharging the water displaced back to the sea 21 surrounding the chamber. As best seen in FIGS. 3 thru 13 this is attained by providing the tank or chamber 20 with opposed openings 27 and 28 located in the wall portion 20B and which opening 27 and 28 are located below the normal liquid level L located within the chamber 20.

Circumscribing opening 27 externally of the tank 20 is a tank extension 29. As best seen in FIGS. 7 to 13, the tank extension 29 comprises a structure having wall portions which circumscribe the opening 17. The top and opposed side wall portions of the tank extension 29 are each provided with valve means 30 which are actuated between an open and closed position. The valve means 30 in the closed position form a wall portion of the tank extension 29 to close off the sea water from the interior of the tank housing 29. In the illustrated embodiment the valve means 30 comprises a series of louver or butterfly type or similar high capacity valve members 30 which are connected so that they are actuated in unison between open and closed position. The arrangement is such that when the valve members 30 are in the closed position, a substantially fluid tight seal is formed.

Referring to FIGS. 3 and 5 the opening 27 formed in the wall portion chamber is also provided with a valving means 31, to valve the opening 27 between open and closed position. Valving means 31 may likewise be formed as a series of louver or butterfly or similar type valve members which are arranged to move in unison between an open and closed position. It will be understood that such valve members may be electrically or mechanically actuated by any suitable valve actuating means.

A displacement cage 35 having valve means is associate in the extractor. The valves of the displacement cage 35 and of the tank extension 29 and of the tank wall opening 27 are basically identically constructed and are able to co-act in sudden removal of accumlatively gathering water portions from the extractor 26 into the sea 21. It will be understood that operation of the valve systems do not require much energy since they do not work between a high and low water pressure.

To effect the extraction and the discharge of the water entering into the chamber or tank 20 so as to prevent the chamber or tank 20 from filling up with water discharging from the turbine 22 and to maintain the pressure differential acting on the turbine 22, a water extraction means 26 is provide. In the illustrated embodiment and as best seen in FIG. 3, the extracting means 26 comprises a beam member 33 shown as being generally rectangular in cross section and which extends transversely of the chamber or tank 20 below the liquid level L. The length of the beam member 33 is such that it extends by approxmately one tank diameter length through the opposed openings 27 and 28 formed in the opposite wall portions of the chamber 20 and the tank extension 29. It will thus be emphasized that the two opposed ends of the beam 33 are disposed in the sea so that the pressures acting on the two ends of the beam are thus equalized. For this reason very little force or energy is required to reciprocate the beam 33, as will be hereinafter described.

Intermediate the ends of the beam there is provided a cut out portion to define a pocket 33A as best seen in FIG. 3. The pocket 33A in the beam 33 is arranged so that the pocket 33A is located immediately to the inside of the valve member 31 valving opening 27 when the beam 33 is in the retracted position.

As best seen in FIGS. 3 and 7 the valve 31 in the tank wall opening 27 is positioned inside the extractor pocket 33A and the displacement cage 35, between the two ends thereof. Thereby the pocket 33A and the displacement cage 35 are able to reciprocate when the valve 31 is open, even when said spaces are filled with water.

Slidably disposed on the beam 33 to define a closure for the pocket 33A is the displacement cage 35. As best seen in FIGS. 4 and 5 the displacement cage 35 is mounted on the extracting beam 33 so as to be also relatively moveable therewith. Referring to FIGS. 4 and 5, it is to be noted that the displacement cage 35 comprises a pair of opposed side walls 35A, a top wall 35B interconnected therebetween and a back wall 35C. The opposed side walls 35A are provided with a inturned flange 35D along the lower edge thereof, and which flanges are adapted to be received in a complementary keyway 36 formed along the opposed side edges of the extracting beam 33.

Flanges 35D defined inturned guides which are received within the keyway 36 so that the displacement cage 35 can slide relative to the beam as will be hereinafter described. The opposed sides 35A, 35A and top 35B of the cage 35 are provided with a series of valve members 37 such as louver or butterfly valve type members which are arranged to swing between open and closed position. The arrangement is such that in the normal retracted position of the beam, as best seen in FIGS. 3, 4, 5 and 7, the cage 35 is located between the opposed ends 33B, 33C of the pocket 33 to define with the pocket 33A chamber which is adapted to confine a predetermined volume of water as will be hereinafter described. It will be understood that the valve members 37 in the opposed sides and top of the valve cage 35 are similarly constructed. With the respective valve members 37, pivoted to their closed position a generally fluid tight seal is formed. Suitable actuators are provided for operating the respective valve members 37; so that the respective valve members 37 of the displacement cage 35 are actuated to open and close in unison.

It will be also understood that the relative movement between the beam 33 and the displacement cage 35 may be affected mechanically by a timing cam and associated connecting linkage, or may be actuated by other known timing devices.

In the illustrated embodiment of a motor means 38 for driving the beam 33 and additionally the displacement cage 35 may be an electric motor or other suitable drving means. It will also be understood that the timing or synchronization of the opening and closing of the respective valve means 37, 31, and 30 can be effected by suitable mechanical linkage and/or by electrical and/or mechanical actuators. Solenoid type actuators may be operatively connected to the valve means which are rendered responsive to suitable known control or timing devices.

The extractor's motor 38 can be driven by any external force, for instance, by a battery or electricity arriving from the surface or from any desired external source, the output of which can be readily utilized to do useful work in any well-known manner.

OPERATION

In order to make the understanding easier, the operation is first described generally with pertinent principles and hydrodynamical considerations, and then in particulars with technical details. While the generator unit works with the possible highest sea pressures, the extractor 33 works amid artificially decreased sea pressures. These facts determine in the first place the style of operation.

Operation of the power generating unit takes place similarly to other rotating engines. It works continuously since in front of its outlet valve 22B constantly low pressure prevails.

It is a condition of great importance, that the local masses of the deep sea water can be made artificially robust or powerless depending on their connection or disconnection to the bulk of the ocean. The power generating unit operates in the robust surrounding. In contrast, the exractor operates in the first place, in a relatively low pressure surrounding within the tank extension 29, their energy account corresponds fully to their separate, individual circumstances.

During phase 1 the displacement cage 35 which removes the superflouous water from the tank 20 into the ocean, does not meet high pressures during its advancement because its trip takes place into the tank extension 29 where low pressure prevails temporarily, since the tank extension valves 30 cut off the connection between the extension interior 29 and the ocean. Thus, the extractor 33 and the displacement cage 35 essentially unhindered reach an actual sea area inside the depressurized interior of the tank extension 29. Absence of counter pressures is obvious, inasmuch as the two outer ends of the extractor beam are exposed to opposed, equal forces and therefore is in equilibrium. It is thus clear that the action of the extractor 26 is not pumping but only acting in delivery in a tamed water area. As a consequence, it is not necessary to apply excessive pressures against non-existing counter pressures. The closed tank extension valves 30 do not permit the sea pressure force to act on the cage. As a consequence, only minor reistances are to be overcome like inertia, water resistance to velocity and internal frictions of implements. It is obvious thus, that during phase 1 the extractor 26 did not require significant quantity of energy to its operation. During phase 2 the valves of the tank extension 29 and displacement cage 35 are opened to the seas and the valve 31 between the tank 20 and the tank extension 29 is closed. Thus, the delivered water portion is completely in the sea. When the reversed motor 38 pushes back the extractor beam 26 toward the center of the tank 20, the extractor beam 26 enters the interior of the tank extension 29 and of the temporarily arrested displacement cage 35. Thereby the common water contents of the displacment cage 35 and of the tank extension 29 is pushed out or mixed into the sea water. It is evident, that this action does not require significant quantity of energy, being the action only a mixing procedure between homogenous water portions, which are at equal pressures. In the mean time, the extractor's pocket 33A reaches the center of the tank 20 which movement does not meet significant resistance since the extractor beam 26 is in equilibrated condition. Consequently minimal driving force is required.

During phase 3 the previously arrested displacement cage 35 subsequently is also retracted to its original position. The movement of the displacement cage 35 occurs entirely in low pressure area, thus without significant energy requirement. The returned displacement cage 35 is filled up with water and the cycle repeats itself.

It will be noted, that the energy requirement of the extractor is always the same regardless of the sea depth. Namely, the opposed and mutually offsetting horizontal sea pressures at the two ends of the extractor 26 do not influence the play of forces, therefore they are negligible from the energy calculations.

It is obvious, that during the afore mentioned three phases comparatively minimal forces are applied for the operation of the extractor 26 and to the cage in the tank extension 29, and these forces are not necessarily an obligatory part of the energy produced by the power generating unit. The two components of the device are energy wise fully independent. The driving energy of the extractor 33 represent only a small fraction of the energy production of the power generating unit. The extractor 33 might receive the required energy from any desired external source. It is not provided imperatively by the power generating unit. Thus, it is plausible that the power generating unit has not to exert the greater part of its produced energy, or even in excesses, for the operation of the extractor.

The balance sheet for the underwater power plant is extremely favorable. From the abundant electric energy production of the power generating unit relatively small items as energy consumption of the extractor, transformer, cleaning arrangements, lighting, underwater television etc, are to be deducted. The balance is still excellent. It can be legitimately stated that the device is feasible and useful.

The operation of the apparatus, with mechanical details, takes place as follows:

The tank chamber 20 is submerged to desired ocean depth and the inlet of the turbine 22, which can be controlled by suitable valves is opened and the high pressure has been exerted by the seas on the inlet 22A. The outlet 22B of the turbine is disposed to the low pressure of the tank. The differential in pressure effects the flow of sea water from high pressure side to low pressure side of the turbine 22 to effect the drive thereof.

When the beam 33 is disposed in its fully retracted position, as best seen in FIG. 7, and with the displacement cage 35 disposed relative to the beam 33 so that the back of the displacement cage 35 is disposed adjacent to the left end wall 33C of the pocket, the displacement cage 35 defines a compartment which is located within the tank 20 below the normal water level L. With the valve members 37 of the displacement cage 35 pivoted to their open position as seen in FIG. 8, the water in tank 20 will flood the compartment defined by the displacement cage 35. When the compartment is flooded, the cage valve members 37 are moved to their closed position to confine the liquid or fluid within the packet portion of the beam 33. With the liquid thus confined within the displacement cage 35, the displacement cage 35 is ready to be displaced.

To effect the discharge of the used sea water portion confined in cage 35, the valves 31 in the tank wall opening are first moved to open position. Then the motor 38 starts and pulls forward the extractor beam 26 together with cage 35 with the water portion which is displaced through the opening 27, 31, to a position indicated in FIGS. 9 and 10. In the position noted in 10, the volumn of water confined within the displacement cage 35 is located to the exterior or sea side of opening 27 and its valve member 31. When the extraction beam 33 has moved to the end of its travel as indicated in FIG. 10, the valving members 31 valving opening 27 move to their closed position. The valve members 37 of the displacement cage 35 which are disposed in alignment with the valving members 30 of the tank extension 29 in the protracted position are moved to their respective coinciding opened position.

Thus, the water now contained within the cage 35 is disposed in open communication with the surrounding sea on the exterior side of the chamber or tank 20.

When the valves of the tank extension 29 and of the displacement cage 35 become open, their water contents assumes immediately the high pressure of the surrounding area, since the given water portion is exposed to the same gravitational forces as other sea water masses at the same ocean depth. Thus, the discharging water portion regains automatically its full potential energy.

Between the extractor body 26 and the tank extension wall 29 a longitudinal space is filled with low pressure water. This comparatively minor quantity of water is softly expelled back into the low pressure tank 20 interior through a suitable channel (not shown).

It is obvious, that during protraction no high sea pressure forces has to be overcome, no equal or exceeding counter pressures are exerted, and no significant energy is required.

Following the displacement cage 35 is temporarily arrested by suitable means and is maintained in its foremost position as shown in FIG. 10. Then the reversed and restarted motor 38 actuates the extractor beam 26 to shift to the left as is viewed in FIG. 11. During retraction valves 31 are closed. Since the valves 37 of the displacement cage 35 and valves 30 of the tank extension 29 are open upon the retracted stroke of the beam 26 the water in the displacement cage 35 is forced out through the aligned valves of the tank extension 29 and the arrested displacement cage 35 as the confined water in cage 35 cannot re-enter the tank because of closed valves 31. Now a soft mixing procedure takes place which does not require any significant effort, since the mixing water masses have identical pressures. Meanwhile, the median part of the extractor beam 33 with its pocket, reaches the center of the air tank 20 also without significant effort, since carrying out its movement is in the low pressure area and since the movement of the extractor beam is in equilibrium. After the execution of the retraction, including the closing of the valve system of the tank extension the empty displacement cage 35 is subsequently retracted into its original position, as is viewed in FIG. 13, in low pressure water, also without significant effort.

In the retracted position valves 37 are opened to permit water in the air tank 20 to again flood into the displacement cage 35. The cycle or reciprocation of the beam 33 is thus repeated at a rate sufficient to prevent the tank 20 from filling up.

During retraction of the displacement cage 35 a longitudinal space develops between the tank extension wall 29 and the extractor body 26. This space is gradually filled up with low pressure water from the tank 20, through a suitable controlled channel (not shown).

For the purpose of this description, the valve housing 29 has been described as circumscribing only one of the wall opening, viz opening 27. However, if desired, it will be understood that a somewhat similar housing (not shown) can be provided so as to circumscribe the opposite tank opening 28, if it seems necessary for some special reason, for instance, in order to stabilize further the balance of the extractor 26.

The described invention offers abundant electricity of which production takes place within the power generating unit. At about 10,000 ft sea depth a large turbine generator unit is able to produce several hundred thousand Kw of electricity, provided however that the used sea water can be continuously returned to the sea, which according to this invention is carried out entirely by an independently operated extractor means. Proportion between the produced electricity and the extractor's energy consumption is roundly ten to one or even substantially less. It is basically important that the extractor is not dependent on the power generating unit at all. Both can draw their separate energy for operation from separate external power sources. The above described invention is based on existing overlooked hydrodynamical possibilities, within the laws of physics. The result is an abundant energy supply with highly economical and harmless operation.

While the present invention has been described with respect to a particular embodiment thereof, it will be readily appreciated and understood that variation and modifications may be made without departing from the spirit or scope of the invention.

What is claimed is:

1. An apparatus for extracting fluid from a depressurized vessel comprising a closed tank adapted to contain a water level and a relatively large air cushion at low pressure said tank having two openings formed in opposed wall portions thereof below the level of the fluid, one of said openings defining a port opening, an external tank extension circumscribing said port opening and including valve means, valving said port opening, said tank extension having valve means, a fluid extracting means slidably mounted to reciprocate through said openings transversely of said tank and associated extension between a retracted and protracted position, and a displacement cage associated with said tank extension and relative reciprocating movement with said extraction means and said tank extension, said displacement cage having valving means complementing the valve means of said tank extension, actuating means operatively connected to each of said respective valve means to co-ordinate the opening and closing of said valve means in a predetermined sequence so as to effect the extraction of the fluid from said tank to the exterior thereof, and means for effecting the drive of said fluid extracting means between the protracted and retracted position.

2. An apparatus as defined in claim 1 wherein said displacement cage is slidably mounted relative to said fluid extracting means for relative reciprocating movement relative thereto.

3. An apparatus as defined in claim 1 wherein said fluid extracting means comprises a beam having a pocket formed intermediate the length thereof whereby said pocket is disposed within said tank in the retracted position of said beam and disposed in said tank extensio in the protracted position of said beam, and said displacement cage circumscribing said pocket whereby said cage co-operates with said pocket to define a displaceable compartment for effecting the displacement of a volume of fluid within said tank substantially equal to the volume of said compartment as said beam is reciprocated.

4. An apparatus as defined in claim 3 wherein said valve means of said displacement cage define the wall portions thereof whereby in the open position said cage valve means permits fluid to flow into said pocket in the retracted position of said beam and when said cage valve means are closed confines said fluid within said pocket.

5. An apparatus as defined in claim 4 wherein the valve means valving said port opening are open on the protracting movement of said beam and closed on the retracting movement of said beam.

6. An apparatus as defined in claim 5 wherein said displacement cage is adapted to move in unison with said beam on the protracting movement of said beam with the valve means of said cage closed to effect displacement of the volume of fluid contained in said pocket, and wherein said cage is separately retained in said extension on the retracting stroke of said beam whereby the valve means of said port opening is closed and the valving means of said displacement cage and tank extension are opened to effect the discharge of said displaced volume of fluid externally of said tank upon the retraction of said beam.

7. A water extractor comprising a closed air tank for receiving a supply of water and having a low pressure water level and a low pressure air cushion therein, said closed tank having an opening formed in a wall portion thereof disposed below the level of the water therein, a tank extension circumscribing said opening, a valve means for valving said tank opening between an open and closed position, an extractor beam extending transversely of said close vessel and associated tank extension and tank opening, said beam having a recessed portion defining a chamber therein, said recessed portion being disposed to accommodate said valve means valving said tank opening, a cage slidably disposed relative said beam for movement relative thereto, said cage being disposed relative to said recess portion to define therewith a water compartment, said cage having a valve means to control the flow of water into and out of said water compartment, said tank extension having valve means in the walls thereof, and means for sequencing the reciprocation of said extractor beam and associated cage and the respective valve means whereby a portion of the water within the close tank is extracted out of said vessel and discharged exteriorly of said tank as said beam and associated cage are reciprocated relative to one another and whereby water is permitted to flood and fill the cage in the retracted position thereof, the valve means of said cage being operated to confine the water in said chamber, and whereby said beam and cage with the water confined therein being protracted into said tank extension and whereby said valve means of said extension and cage are sequenced to their respective open position in the protracted position as the valve means of said tank opening are closed so that upon retraction of said beam independently of said cage effects a discharge of the water out of said beam compartment and associated cage and vessel extension to the exterior thereof.

* * * * *